(12) United States Patent
Futa et al.

(10) Patent No.: US 9,068,509 B2
(45) Date of Patent: Jun. 30, 2015

(54) GAS TURBINE ENGINE FUEL CONTROL THRUST CONTROL OVERRIDE SYSTEM

(75) Inventors: Paul Futa, North Liberty, IN (US); Larry Portolese, Granger, IN (US); David Lawrence, South Bend, IN (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 1303 days.

(21) Appl. No.: 12/947,411

(22) Filed: Nov. 16, 2010

(65) Prior Publication Data

US 2012/0067022 A1  Mar. 22, 2012

Related U.S. Application Data

(60) Provisional application No. 61/380,941, filed on Sep. 8, 2010.

(51) Int. Cl.
| | |
|---|---|
| *F02C 7/22* | (2006.01) |
| *F02C 7/232* | (2006.01) |
| *F02C 9/26* | (2006.01) |

(52) U.S. Cl.
CPC .................. *F02C 7/232* (2013.01); *F02C 9/263* (2013.01); *F05D 2270/051* (2013.01)

(58) Field of Classification Search
CPC ............ F02C 7/236; F02C 7/22; F02C 7/232; F02C 7/16; F02C 7/26; F02C 7/263; F02C 7/28
USPC .................... 60/734, 39.821, 39.282, 39.281; 251/30.01; 137/116.5
See application file for complete search history.

(56) References Cited

U.S. PATENT DOCUMENTS

| | | | |
|---|---|---|---|
| 6,578,353 B2 * | 6/2003 | Maillard et al. ........... | 60/39.281 |
| 2003/0074884 A1 | 4/2003 | Snow et al. | |

FOREIGN PATENT DOCUMENTS

| | | |
|---|---|---|
| CN | 1032840 A | 5/1989 |
| CN | 101128661 A | 2/2008 |
| EP | 0886053 A2 | 12/1998 |
| EP | 1355054 A2 * | 10/2003 |
| EP | 2124123 A2 | 11/2009 |

OTHER PUBLICATIONS

CN Office Action for Application No. 201110305144.8 dated Nov. 4, 2014.

* cited by examiner

*Primary Examiner* — Phutthiwat Wongwian
*Assistant Examiner* — Marc J Amar
(74) *Attorney, Agent, or Firm* — Ingrassia Fisher & Lorenz, P.C.

(57) ABSTRACT

A gas turbine engine fuel control system is provided that includes a fuel metering valve and a thrust control valve. The fuel metering valve includes a metering valve inlet and a metering valve outlet. The metering valve inlet is adapted to receive a flow of fuel, and is configured to control the flow of fuel through the metering valve outlet. The thrust control valve is adapted to receive thrust control valve override signals and is configured, in response thereto, to move from a first position, in which flow from the metering valve is not impacted, and a second position, in which flow from the metering valve is blocked while flow through a fixed-area orifice is allowed.

16 Claims, 5 Drawing Sheets

GAS TURBINE ENGINE FUEL CONTROL THRUST CONTROL OVERRIDE SYSTEM

PRIORITY CLAIMS

This application claims the benefit of U.S. Provisional Application No. 61/380,941 filed Sep. 8, 2010.

TECHNICAL FIELD

The present invention generally relates to gas turbine engines, and more particularly relates to a thrust control override system for an engine fuel control system.

BACKGROUND

A fuel system in an aircraft is designed to supply high pressure fuel to the engines which power the aircraft. Typical gas turbine engine fuel supply systems include a fuel source, such as a fuel tank, and one or more pumps. The one or more pumps draw fuel from the fuel tank and deliver pressurized fuel to one or more primary fuel loads and to one or more secondary fuel loads via one or more supply lines. Generally, the primary fuel loads, which include the fuel manifolds in the engine combustor, are supplied with fuel via, for example, a priority flow line. The secondary fuel loads, which may include a motive flow valve and regulator, one or more variable geometry actuators, and one or more bleed valves, are supplied with fuel via, for example, a secondary flow line.

The priority flow line may include one or more valves in flow series between the pumps and the fuel manifolds. These valves generally include at least a metering valve and a pressurizing valve. The metering valve is typically configured to control priority flow to the one or more primary fuel loads. The pressurizing valve, which is typically disposed downstream of the metering valve, functions to maintain a minimum system pressure magnitude in portions of the supply lines. More specifically, the pressurizing valve typically maintains pump discharge backpressure above a minimum pressure magnitude.

Though highly unlikely, it is postulated that a loss or increase of metered burn flow to an engine could occur. Hence, many aircraft fuel systems are designed with a thrust control override system to accommodate this postulated event. The intended effect of a thrust control override system is to set the burn flow rate to the engine at a predetermined constant flow rate, typically near an engine idle condition. This is because it is desirable to have the engine at idle speed verses shutting the engine down, thereby allowing the engine to continue to drive electrical generators and various other loads. However, most thrust control override systems presently known are relatively complex, and thus relatively costly.

Hence, there is a need for a thrust control override system that is less complex and/or costly as compared to presently known systems. The present invention addresses at least this need.

BRIEF SUMMARY

In one embodiment, and by way of example only, a gas turbine engine fuel control system includes a fuel metering valve and a thrust control valve. The fuel metering valve comprises a metering valve inlet and a metering valve outlet. The metering valve inlet is adapted to receive a flow of fuel. The fuel metering valve is further adapted to receive fuel flow command signals and is configured, in response thereto, to control the flow of fuel through the metering valve outlet. The thrust control valve comprises a main inlet, an override inlet, and a thrust control valve outlet. The main inlet is in fluid communication with the metering valve outlet, and the override inlet is in fluid communication with the metering valve inlet. The thrust control valve is adapted to receive thrust control valve override signals and is configured, in response thereto, to move from a first position to a second position. In the first position, the thrust control valve outlet is in fluid communication with the main inlet and is fluidly isolated from the override inlet, and in the second position, the thrust control valve outlet is in fluid communication with the override inlet and is fluidly isolated from the main inlet.

In another embodiment, a gas turbine engine fuel control system includes a fuel pump, a fuel metering valve, a bypass valve, and a thrust control valve. The fuel pump is adapted to receive fuel at a pump inlet pressure and to supply the fuel at a pump discharge pressure. The fuel metering valve comprises a metering valve inlet and a metering valve outlet. The metering valve inlet is coupled to receive a first portion of the fuel supplied from the fuel pump. The fuel metering valve is also adapted to receive fuel flow command signals and is configured, in response thereto, to control fuel flow through the metering valve outlet. The bypass valve comprises a bypass valve inlet and a bypass valve outlet. The bypass valve inlet is in fluid communication with the metering valve inlet. The bypass valve is configured to selectively bypass a second portion of the fuel supplied from the fuel pump away from the fuel metering valve. The thrust control valve comprises a main inlet, an override inlet, and a thrust control valve outlet. The main inlet is in fluid communication with the metering valve outlet, and the override inlet is in fluid communication with the metering valve inlet and the bypass valve inlet. The thrust control valve is adapted to receive thrust control valve override signals and is configured, in response thereto, to move between a first position to a second position. In the first position, the thrust control valve outlet is in fluid communication with the main inlet and is fluidly isolated from the override inlet, and in the second position, the thrust control valve outlet is in fluid communication with the override inlet and is fluidly isolated from the main inlet.

In yet another embodiment, a gas turbine engine fuel control system includes a fuel metering valve and a thrust control valve. The fuel metering valve comprises a metering valve inlet and a metering valve outlet. The metering valve inlet is adapted to receive a flow of fuel. The fuel metering valve is adapted to receive fuel flow command signals and is configured, in response thereto, to control the flow of fuel through the metering valve outlet. The thrust control valve comprises a valve body, a thrust control valve element, and an actuator element. The valve body has a main inlet, an override inlet, a thrust control valve outlet, a valve control pressure inlet port formed therein, and a fixed-area metering port disposed between the override inlet and the thrust control valve outlet. The main inlet is in fluid communication with the metering valve outlet, and the override inlet is in fluid communication with the metering valve inlet. The thrust control valve element is disposed within the valve body and is movable between a first position, in which the thrust control valve outlet is in fluid communication with the main inlet and fluidly isolated from the override inlet, and a second position, in which the thrust control valve outlet is in fluid communication with the override inlet and fluidly isolated from the main inlet. The actuator element is coupled to receive thrust control valve override signals and is configured, in response thereto, to move between a high-pressure position and a low-pressure position. In the high-pressure position, the valve control pressure inlet port is adapted to receive fluid at a first pressure magnitude, to thereby move the thrust control valve element to the first position. In the low-pressure position, the valve control pressure inlet port is adapted to receive fluid at a second pressure magnitude, which is lower than the first pressure magnitude, to thereby move the thrust control valve element to the second position.

Furthermore, other desirable features and characteristics of the thrust control override system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
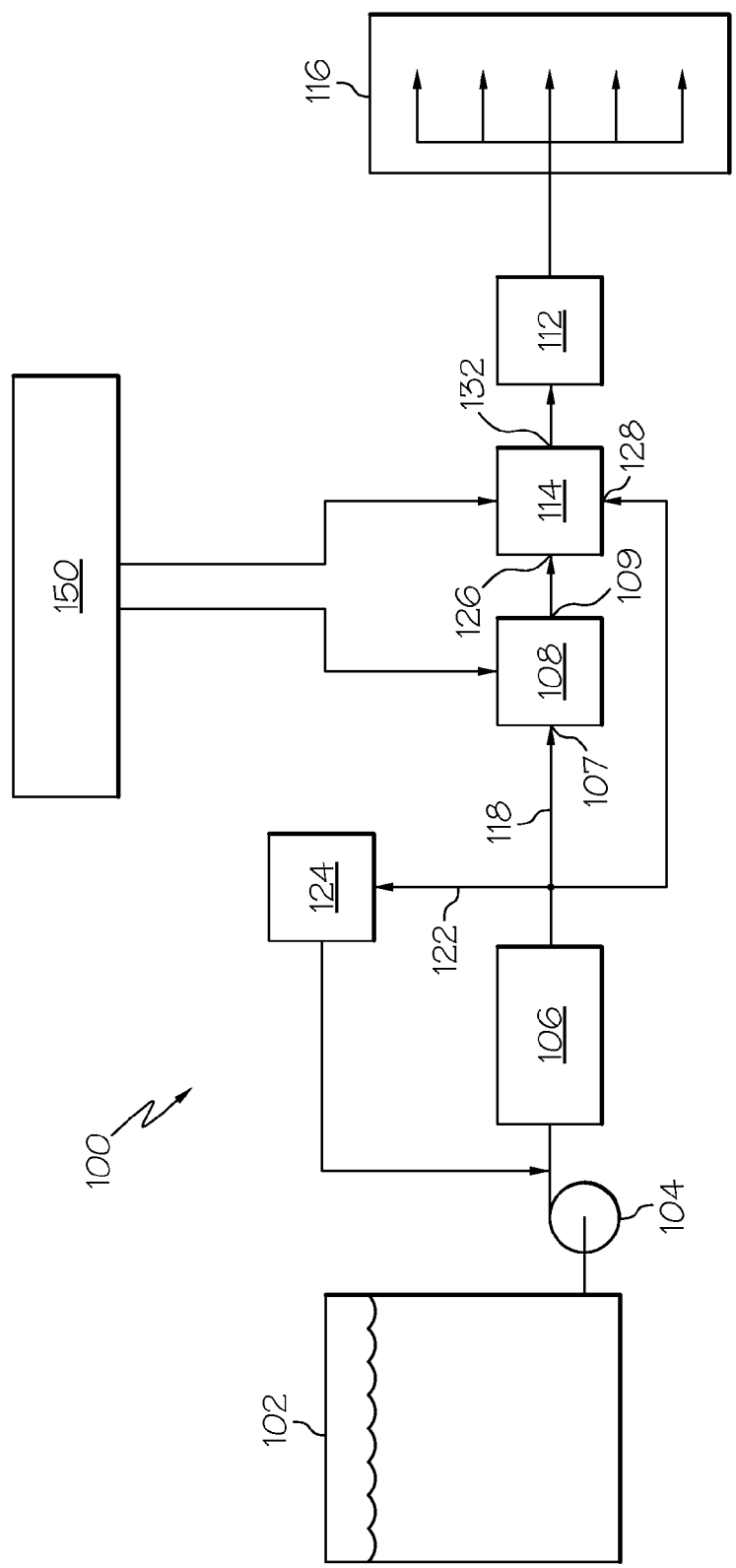
FIG. 1 depicts a schematic representation of an embodiment of gas turbine engine fuel control system.

Turning now to FIG. 1, a simplified schematic diagram of one embodiment of a fuel control system for a gas turbine engine, such as a turbofan jet aircraft engine, is depicted. The system 100 includes a fuel source 102, one or more pumps 104, 106, a fuel metering valve 108, a pressurizing valve 112, a thrust control valve 114, and an engine control 150. The fuel source 102, which is preferably implemented as one or more tanks, stores fuel that is to be supplied to a plurality of fuel loads 116 (only one depicted). It will be appreciated that the number and type of fuel loads may vary. In the depicted embodiment, however, only a gas turbine engine combustor zone and associated nozzles 116 are depicted. The fuel loads 116 are preferably classified as primary and secondary fuel loads based, for example, on functionality. Though the classifications may vary, the gas turbine engine combustor zone and associated nozzles 116 are typically classified as primary fuel loads. Loads typically classified as secondary loads include a motive flow valve and regulator, one or more variable geometry actuators, and one or more bleed valves.

Each of the one or more pumps 104, 106 is positioned in flow-series in a supply line 118 and take a suction on the fuel source 102. In the depicted embodiment, two engine-driven pumps are used and include a boost pump 104, such as a relatively low horsepower centrifugal pump, and a high pressure pump 106, such as a positive displacement pump, a centrifugal pump, or a variable displacement piston pump. The boost pump 104 takes a suction directly on the fuel source 102 and provides sufficient suction head for the high pressure pump 106. The high pressure pump 106 then supplies the fuel at a relatively high pressure to the supply line 118. Although not depicted, it will be appreciated that the system 100 may additionally include a low pressure pump within the fuel tank(s) 102 to supply fuel to the boost pump 104. It will additionally be appreciated that one or both of the pumps 104, 106 may be driven by an electric motor, rather than the engine.

The fuel metering valve 108 is positioned in flow-series in the supply line 118 downstream of the high pressure pump 106, and includes a metering valve inlet 107 and a metering valve outlet 109. The metering valve inlet 107 is coupled to receive a first portion of the fuel supplied from the fuel pump. The fuel metering valve 108 is also coupled to receive fuel flow command signals supplied from, for example, the engine control 150. The fuel metering valve 108 is operable, in response to the fuel flow command signals, to control fuel flow through the metering valve outlet 109 and to the gas turbine engine combustor zone and associated nozzles 116.

As FIG. 1 further depicts, the system 100 additionally includes a bypass flow line 122 and a bypass valve 124. The bypass flow line 122, at least in the depicted embodiment, is coupled to the supply line 118 between the high pressure pump 106 and the fuel metering valve 108. The bypass valve 124 is disposed in the bypass flow line 122 and is operable to selectively bypass a second portion of the fuel in the supply line 118 away from the fuel metering valve 108 and back to the inlet of the high pressure pump 106. It will be appreciated that in other embodiments, the bypass flow line 122 may be connected to the inlet of the booster pump 104 or to the fuel source 102, rather than the inlet of the high pressure pump 106. The bypass valve 124 is preferably controlled in response to bypass valve commands. These bypass valve commands may be electrical or hydraulic, and may be supplied from either the fuel metering valve 108 or the engine control 150. As with the fuel metering valve 108, it will be appreciated that in some embodiments the system 100 may be implemented without the bypass flow line 122 and/or bypass valve 124.

The pressurizing valve 112 is disposed in the supply line 118 upstream of the primary fuel loads 116 and downstream of the thrust control valve 114. As FIG. 1 also depicts, the pressurizing valve 112 is additionally in fluid communication with the supply line 118 upstream of the high pressure pump 106. The pressurizing valve 112 is configured to maintain a minimum pump discharge backpressure downstream of the high pressure pump 106, and shuts when the pressure falls below this minimum pump discharge backpressure.

The thrust control valve 114 is disposed in the supply line 118 between the fuel metering valve 108 and the pressurizing valve 112, and includes a main inlet 126, an override inlet 128, and a thrust control valve outlet 132. The main inlet 126 is in fluid communication with the metering valve outlet 109, and receives fuel discharged therefrom. The override inlet 128 is in fluid communication with the metering valve inlet 107, and the thrust control valve outlet 132 is in fluid communication with the pressurizing valve 112. The thrust control valve 114 is movable between a first position and a second position. In the first position, which is its normal operating position, the thrust control valve outlet 132 is in fluid communication with the main inlet 126 and is fluidly isolated from the override inlet 128. Thus, fuel discharged from the fuel metering valve 108 flows freely through the thrust control valve 114. In the second position, the thrust control valve outlet 132 is in fluid communication with the override inlet 128 and is fluidly isolated from the main inlet 126. Thus, the thrust control valve 114 blocks flow discharged from the fuel metering valve 108, and supplies fuel to the pressurizing valve 112 via a secondary fixed-area metering port (not depicted in FIG. 1). The thrust control valve 114 is coupled to selectively receive a thrust control override signal from, for example, the engine control 150. The thrust control valve 114 is operable, in response to the thrust control override signal, to move between the first position and the second position.

The engine control 150, which may be, for example, a Full Authority Digital Engine Controller (FADEC), controls the overall operation of the gas turbine engine (or engines), including the flow of fuel from the fuel source 102 to the fuel loads 116. The engine control 150 preferably receives various input signals and supplies commands to one or more of the pumps 104, 106, the fuel metering valve 108, and the thrust control valve 114, to thereby control the fuel flow rate to the combustor nozzles 116. The engine control 150, among various other functions, determines the operability of the fuel metering valve 108. If the engine control determines that the fuel metering valve 108 is either inoperable or operating improperly, the engine control supplies a signal to the thrust control valve 114 that causes the thrust control valve 114 to move from the first position to the second position.

Figure 2:
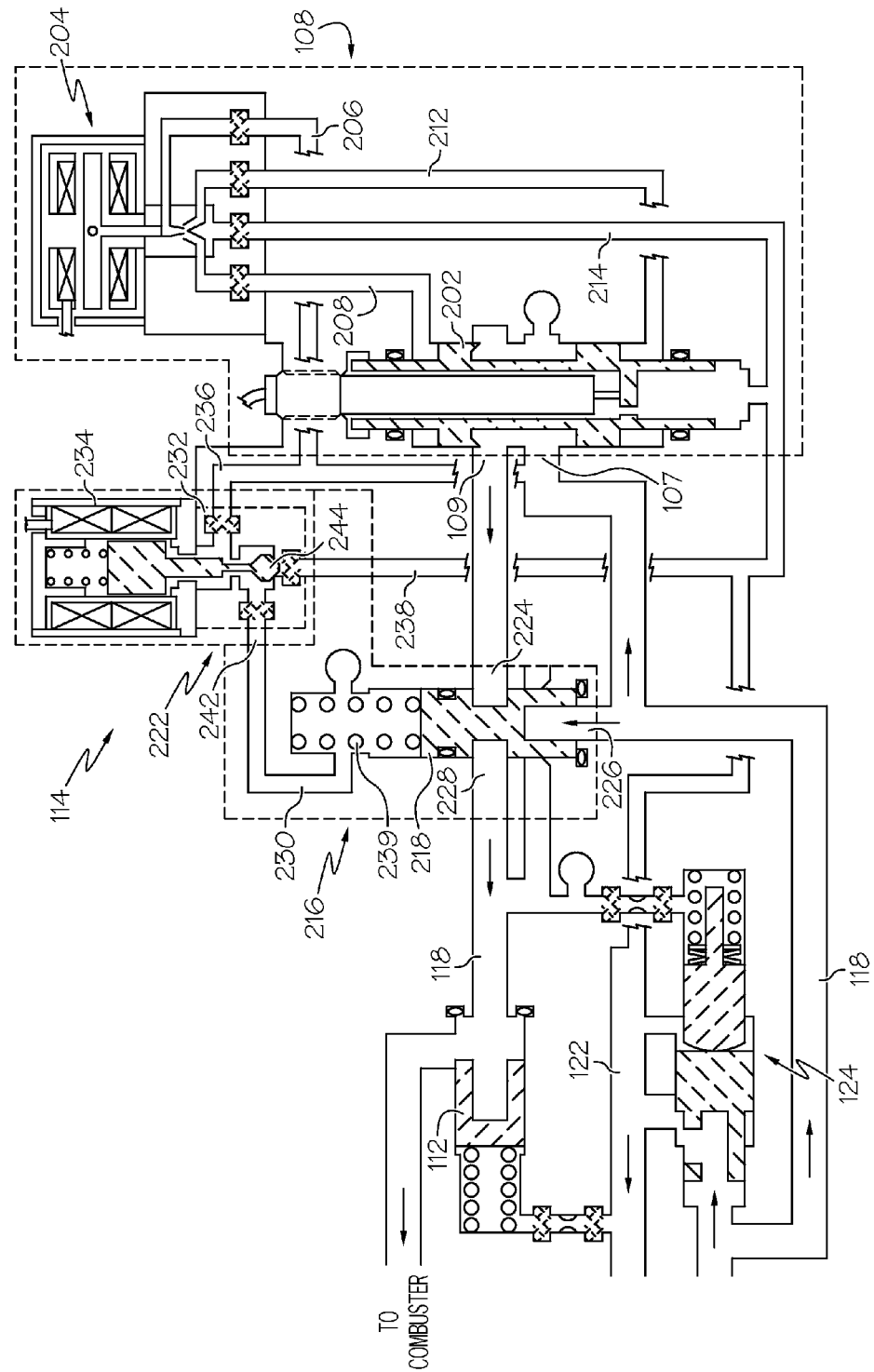
FIGS. 2 and 3 depict more detailed schematic representations of a portion of the system of FIG. 1 with the thrust control valve in first and second positions, respectively.
Figure 3:
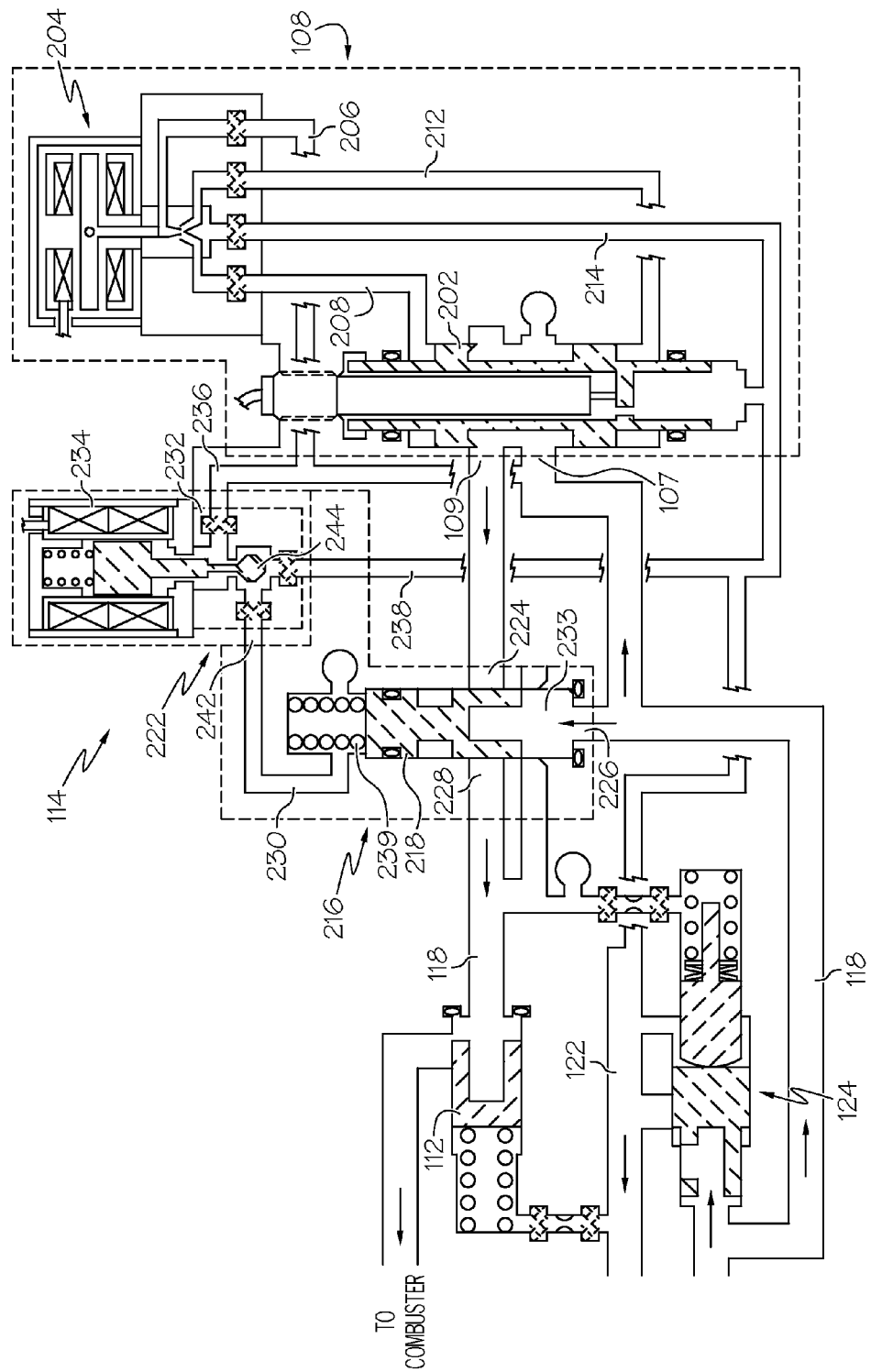

Referring to FIGS. 2 and 3, a more detailed schematic representation of a portion of the fuel control system 100 described above is depicted and will now be described. The portion of the system 100 that is depicted includes the fuel metering valve 108, the pressurizing valve 112, the thrust control valve 114, the bypass valve 124, portions of both the supply line 118 and the bypass flow line 122, and various hydraulic control pressure lines. It is noted that like reference numerals in FIGS. 1 and 2-5 refer to like components.

The fuel metering valve 108, in addition to the metering valve inlet 107 and metering valve outlet 109, includes a valve element 202 and a metering valve actuator 204. The valve element 202 is movable, in response to hydraulic control pressures received from the metering valve actuator 204, to move and thereby control fuel flow through the metering valve outlet 109. The metering valve actuator 204 is coupled to receive fuel flow commands from the engine control 150 (not depicted in FIGS. 2 and 3) and is configured, in response to the fuel flow commands, to selectively direct fuel from a control pressure line 206 into a close pressure line 208 and an open pressure line 212. If more fuel is directed into the close pressure line 208 than into the open pressure line 212, then the fuel metering valve 108 will move toward a closed position, and less fuel will flow out the metering valve outlet 109. Conversely, if more fuel is directed into the open pressure line 212 than into the close pressure line 208, then the fuel metering valve 108 will move toward a more open position, and more fuel will flow out the metering valve outlet 109. Fuel returned from the control pressure line 206, close pressure line 208, and open pressure line 212, is directed into a servo return line 214. As may be seen, the control pressure line 206 is in fluid communication with the metering valve inlet 107, and the servo return line 214 is in fluid communication with the bypass line downstream of the bypass valve 124. Although the metering valve actuator 204 may be variously implemented, in the depicted embodiment it is implemented using a dual-channel electro-hydraulic servo valve (EHSV).

The thrust control valve 114 includes a valve body 216, a thrust control valve element 218, and an actuator element 222. The valve body 216 has formed therein a main inlet 224, an override inlet 226, a thrust control valve outlet 228, and a valve control pressure inlet port 230. The main inlet 224 is in fluid communication with the metering valve outlet 109, the override inlet 226 is in fluid communication with the metering valve inlet 107, the thrust control valve outlet 228 is in fluid communication with the pressurizing valve 112, and the valve control pressure inlet port 230 is in fluid communication with the actuator element 222.

The thrust control valve element 218 is disposed within the valve body 216 and is movable between a first position and a second position. In the first position, which is the position depicted in FIG. 2, the thrust control valve outlet 228 is in fluid communication with the main inlet 224, and is fluidly isolated from the override inlet 226. In the second position, which is the position depicted in FIG. 3, the thrust control valve outlet 228 is in fluid communication with the override inlet 226, and is fluidly isolated from the main inlet 224. When the thrust control valve element 218 is in the first position, it does not significantly impact metered fuel flow, and fuel exiting the metering valve outlet 109 passes freely through the thrust control valve 114. Conversely, when the thrust control valve element 218 is in the second position, it blocks flow exiting the metering valve outlet 109, and simultaneously opens a fixed-area metering port 233 (see FIG. 3) that is disposed between the override inlet 226 and the thrust control valve outlet 228. As may be appreciated, the thrust control valve element 218 is in the first position during normal system operation, and is moved to the second position in the unlikely event the fuel metering valve 108 becomes inoperable.

The thrust control valve element 218 is moved between the first and second positions in response to hydraulic control signals received from the actuator element 222. The actuator element 222 is coupled to receive the thrust control valve override signals from, for example, the engine control 150. The actuator element 222, in response to the thrust control valve override signals, moves between a high-pressure position and a low-pressure position. In the high-pressure position, which is the position depicted in FIG. 2, the valve control pressure inlet port 230 is coupled to receive fluid at a first pressure magnitude, to thereby move the thrust control valve element 218 to the first position. In the low-pressure position, which is the position depicted in FIG. 3, the valve control pressure inlet port 230 receives fluid at a second, lower pressure magnitude, to thereby move the thrust control valve element 218 to the second position.

To implement its functionality, the depicted actuator element 222 includes an actuator valve 232 and an actuator 234. The actuator valve 232 includes a high-pressure inlet 236, a low-pressure inlet 238, an outlet 242, and an actuator valve element 244. The high-pressure inlet 236 is in fluid communication with the metering valve inlet 107, the low-pressure inlet 238 is in fluid communication with the servo return line 214, and the outlet 242 is in fluid communication with the valve control pressure inlet port 230. The actuator valve element 244 is coupled to the actuator 234, and is moved between the high-pressure position and the low-pressure position by the actuator 234.

The actuator 234 is coupled to receive the thrust control valve override signals and is configured, in response thereto, to move the actuator valve 232, and more specifically the actuator valve element 244, between the high-pressure position and the low-pressure position. When actuator valve 232 is in the high-pressure position, which is the position depicted in FIG. 2, the outlet 242 is in fluid communication with the high-pressure inlet 236 and is not in fluid communication with the low-pressure inlet 238. Thus, the relatively high pressure at the metering valve inlet 107, together with a force supplied from a spring 239, urges the thrust control valve element 218 into the first position. Conversely, when the actuator valve 232 is in the low-pressure position, which is the position depicted in FIG. 3, the outlet 242 is in fluid communication with the low-pressure inlet 238 and is not in fluid communication with the high-pressure inlet 236. As a result, the relatively low pressure in the servo return line 214 urges the thrust control valve element 218, against the force supplied from the spring 239, into the second position.

Figure 4:
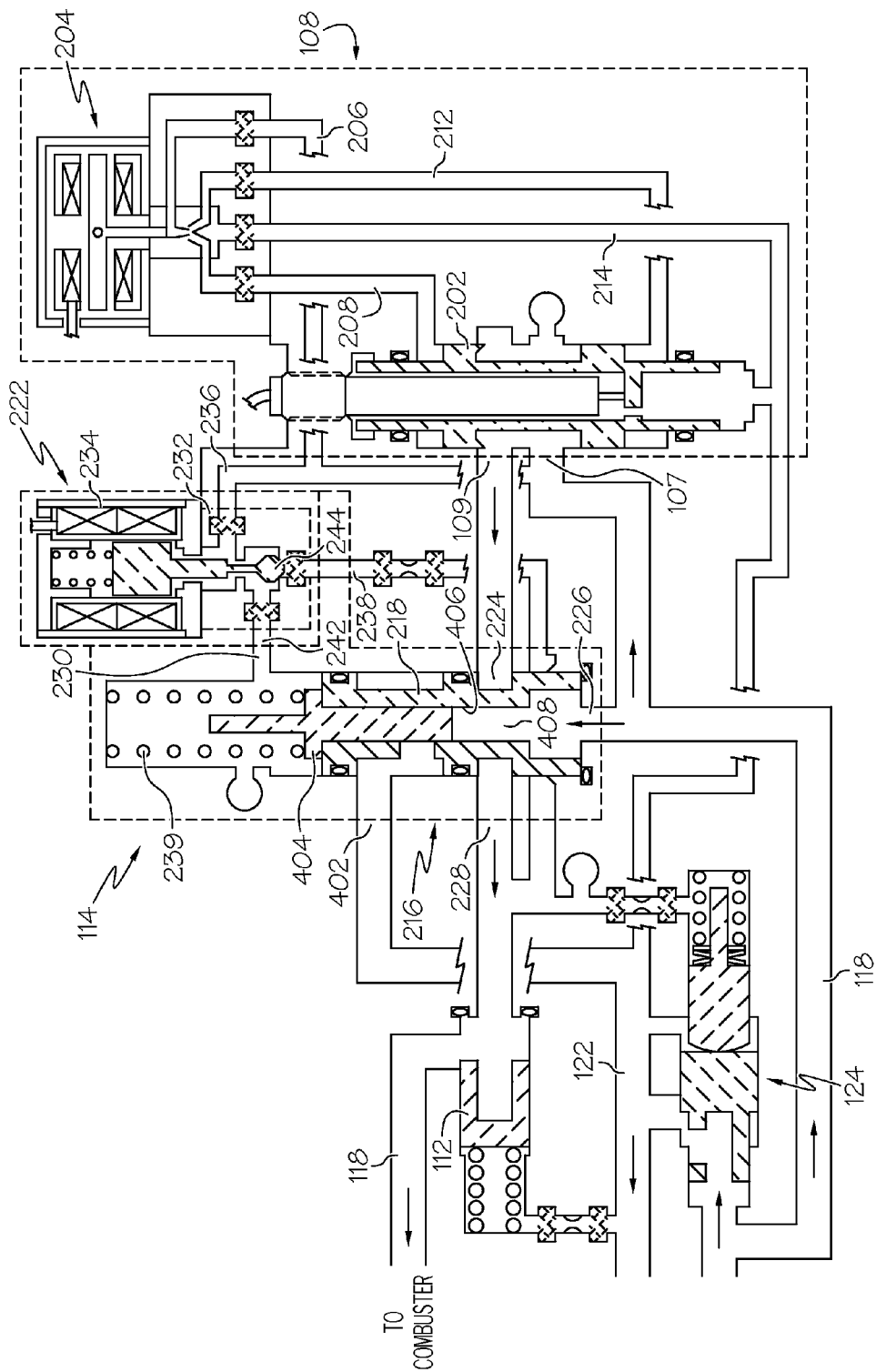
FIGS. 4 and 5 depict more detailed schematic representations of a portion of the system of FIG. 1, according to an alternative embodiment, with the thrust control valve in the first and second positions, respectively.
Figure 5:
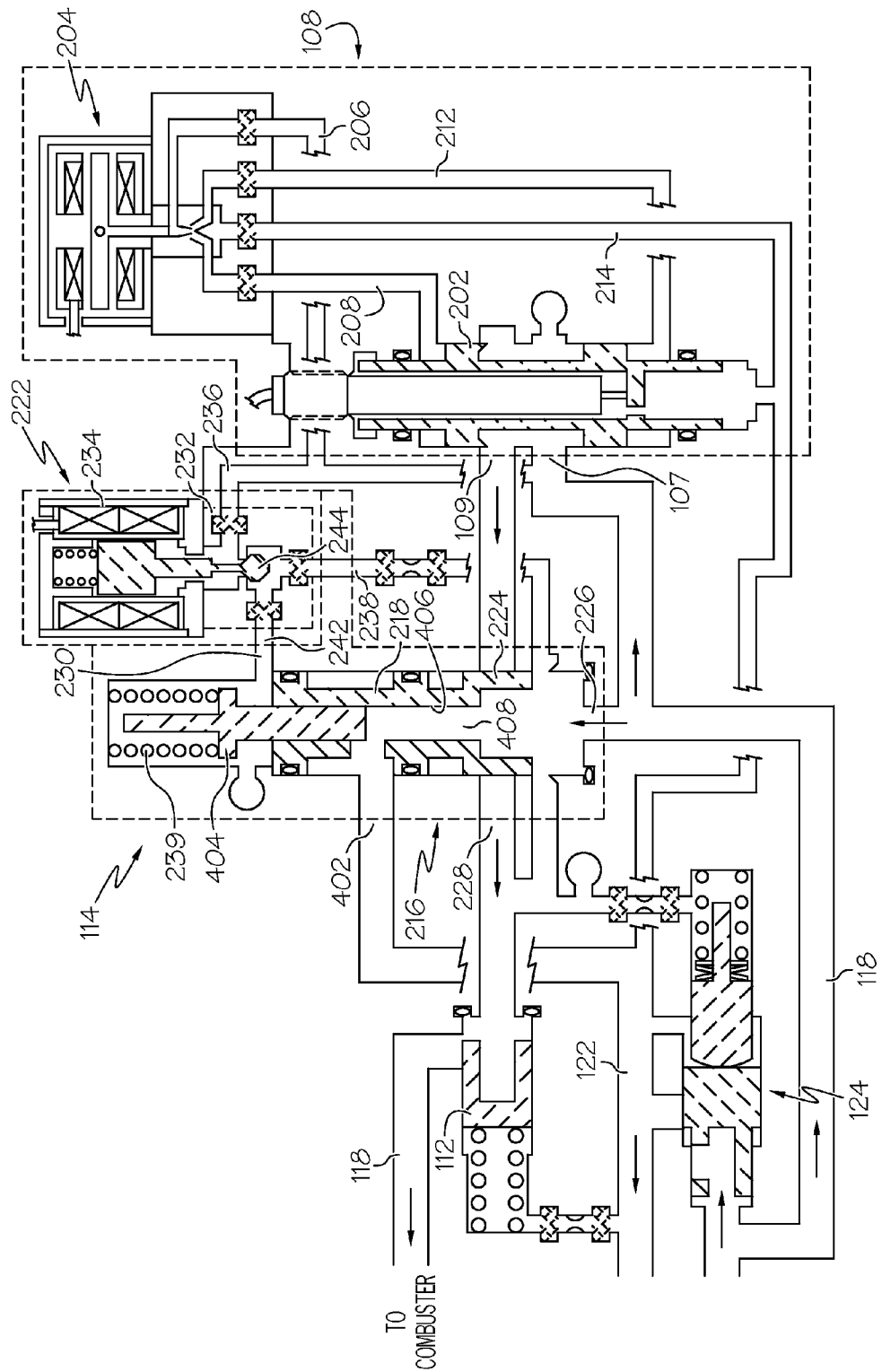

Another detailed schematic representation of a portion of the fuel control system 100 according to a second embodiment is depicted in FIGS. 4 and 5. This alternative embodiment is similar to the first embodiment, but provides protection against the highly unlikely, yet postulated event of an inoperable bypass valve 124. With the exception of the thrust control valve 114, all of the components depicted in FIGS. 4 and 5 are identical (or substantially identical) to those depicted in FIGS. 2 and 3 and described above. Hence, these components are reference using like reference numerals, and the descriptions of these components will not be repeated. Moreover, although not all of the components of the thrust control valve 114 that are depicted in FIGS. 4 and 5 are identical to those depicted in FIGS. 2 and 3, many of the components are identical (or substantially identical). Those components of the thrust control valve 114 that are identical (or substantially identical) are referenced in FIGS. 4 and 5 using like reference numerals, and the descriptions of these identical (or substantially identical) components will also not be repeated.

With the above in mind, it is noted that the thrust control valve 114 depicted in FIGS. 4 and 5 additionally includes a bypass outlet 402 and a proportional bypass valve element 404. The bypass outlet 402 is formed in the valve body 216 and is in fluid communication with the bypass flow line 122. The proportional bypass valve element 404 is disposed within the valve body 216, and is movable with, and selectively movable relative to, the thrust control valve element 218. More specifically, the thrust control valve element 218 includes an inner surface 406 that defines a bore 408. The proportional bypass valve element 404 is movably disposed within the bore 408. Movement of the proportional bypass valve element 404 selectively places the bypass outlet 402 in fluid communication with the override inlet 226.

As with the previously described embodiment, when the thrust control valve element 218 is in the first position, it does not significantly impact metered fuel flow, and fuel exiting the fuel metering valve 108 passes freely through the thrust control valve 114. Similarly, when the thrust control valve element 218 is in the second position, it blocks flow exiting the fuel metering valve, and simultaneously opens the fixed-area metering port 233 that is disposed between the override inlet 226 and the thrust control valve outlet 228. In addition to this, however, the proportional bypass valve element 404 may also implement a secondary proportional bypass feature, such that a portion of the relatively high pressure fluid at the override inlet 226 may be bypassed to the relatively low pressure bypass flow line 122 to control a predetermined pressure drop across the fixed area metering orifice 233.

The thrust control valves 114 described herein override the burn flow commanded by the fuel metering valve 108 to a predetermined constant rate of flow. The thrust control valves may be controlled by a solenoid or servo valve that receives a command from the engine control 150. The thrust control valve 114 and its configuration in the system 100 provides protection for a postulated loss of control of the fuel metering valve 108, which can result from a postulated malfunction of the metering valve physical parts (seized motion/mechanical failure), or loss of the command signal and/or feedback signal that control the metering valve position. Loss of signal could be the result of a postulated inoperability of the EHSV, position sensors within the fuel metering valve 108, or the engine control 150. By adding protection for a postulated failure of the proportional bypass valve, this postulated failure (due, for example, to seized motion/mechanical failure), the head pressure would not be controlled across the fuel metering valve 108, which could result in either too high or too low of the intended burn flow to the engine.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A gas turbine engine fuel control system, comprising:
   a fuel metering valve comprising a metering valve inlet and a metering valve outlet, the metering valve inlet adapted to receive a flow of fuel, the fuel metering valve further adapted to receive fuel flow command signals and configured, in response thereto, to control the flow of fuel through the metering valve outlet; and
   a thrust control valve adapted to receive thrust control valve override signals and configured, in response thereto, to move from a first position to a second position, the thrust control valve comprising:
   a valve body having a main inlet, an override inlet, a valve control pressure inlet port, a bypass outlet port, and a thrust control valve outlet, the main inlet in fluid communication with the metering valve outlet, the override inlet in fluid communication with the metering valve inlet,
   a thrust control valve element disposed within the valve body and movable between the first position and the second position;
   a proportional bypass valve element disposed within the valve body, the proportional bypass valve element movable with, and selectively movable relative to, the thrust control valve element, to thereby selectively place the bypass outlet port in fluid communication with the override inlet; and
   an actuator element coupled to receive the thrust control valve override signals and configured, in response thereto, to move between a high-pressure position and a low-pressure position,
   wherein:
   in the first position, the thrust control valve outlet is in fluid communication with the main inlet and fluidly isolated from the override inlet,
   in the second position, the thrust control valve outlet is in fluid communication with the override inlet and fluidly isolated from the main inlet,
   in the high-pressure position, the valve control pressure inlet port is adapted to receive fluid at a first pressure magnitude, to thereby move the thrust control valve element to the first position, and in the low-pressure position, the valve control pressure inlet port is adapted to receive fluid at a second pressure magnitude, the second pressure lower than the first pressure magnitude, to thereby move the thrust control valve element to the second position.

2. The system of claim 1, wherein the actuator element comprises:
an actuator valve comprising a high-pressure inlet, a low-pressure inlet, and an outlet, the actuator valve movable between the high-pressure position, in which the outlet is in fluid communication with the high-pressure inlet and not in fluid communication with the low-pressure inlet, and the low-pressure position, in which the outlet is in fluid communication with the low-pressure inlet and not in fluid communication with the high-pressure inlet; and
an actuator coupled to receive the thrust control valve override signals and configured, in response thereto, to move the actuator valve between the high-pressure position and the low-pressure position.

3. The system of claim 1, wherein the thrust control valve further comprises a spring, the spring disposed within the valve body and supplying a bias force that urges the thrust control valve element toward the first position.

4. The system of claim 1, wherein:
the thrust control valve element includes an inner surface that defines a bore; and
the proportional bypass valve element is movably disposed within the bore.

5. The system of claim 1, wherein the actuator element comprises:
an actuator valve comprising a high-pressure inlet, a low-pressure inlet, and an outlet, the actuator valve movable between the high-pressure position, in which the outlet is in fluid communication with the high-pressure inlet and not in fluid communication with the low-pressure inlet, and the low-pressure position, in which the outlet is in fluid communication with the low-pressure inlet and not in fluid communication with the high-pressure inlet; and
an actuator coupled to receive the thrust control valve override signals and configured, in response thereto, to move the actuator valve between the high-pressure position and the low-pressure position.

6. The system of claim 1, wherein the thrust control valve further comprises a spring, the spring disposed within the valve body and supplying a bias force that urges the thrust control valve element toward the first position.

7. The system of claim 1, wherein the thrust control valve further comprises a fixed-area metering port disposed between the override inlet and the thrust control valve outlet.

8. The system of claim 1, further comprising a fuel pump adapted to receive fuel at a pump inlet pressure and supply the fuel at a pump discharge pressure to the metering valve inlet and the override inlet.

9. A gas turbine engine fuel control system, comprising:
a fuel pump adapted to receive fuel at a pump inlet pressure and supply the fuel at a pump discharge pressure;
a fuel metering valve comprising a metering valve inlet and a metering valve outlet, the metering valve inlet coupled to receive a first portion of the fuel supplied from the fuel pump, the fuel metering valve further adapted to receive fuel flow command signals and configured, in response thereto, to control fuel flow through the metering valve outlet;
a bypass valve comprising a bypass valve inlet and a bypass valve outlet, the bypass valve inlet in fluid communication with the metering valve inlet, the bypass valve configured to selectively bypass a second portion of the fuel supplied from the fuel pump away from the fuel metering valve; and
a thrust control valve adapted to receive thrust control valve override signals and configured, in response thereto, to move from a first position to a second position, the thrust control valve comprising:
a valve body having a main inlet, an override inlet, a valve control pressure inlet port, a bypass outlet port, and a thrust control valve outlet, the main inlet in fluid communication with the metering valve outlet, the override inlet in fluid communication with the metering valve inlet,
a thrust control valve element disposed within the valve body and movable between the first position and the second position;
a proportional bypass valve element disposed within the valve body, the proportional bypass valve element movable with, and selectively movable relative to, the thrust control valve element, to thereby selectively place the bypass outlet port in fluid communication with the override inlet; and
an actuator element coupled to receive the thrust control valve override signals and configured, in response thereto, to move between a high-pressure position and a low-pressure position,
wherein:
in the first position, the thrust control valve outlet is in fluid communication with the main inlet and fluidly isolated from the override inlet,
in the second position, the thrust control valve outlet is in fluid communication with the override inlet and fluidly isolated from the main inlet,
in the high-pressure position, the valve control pressure inlet port is adapted to receive fluid at a first pressure magnitude, to thereby move the thrust control valve element to the first position, and
in the low-pressure position, the valve control pressure inlet port is adapted to receive fluid at a second pressure magnitude, the second pressure lower than the first pressure magnitude, to thereby move the thrust control valve element to the second position.

10. The system of claim 9, wherein the actuator element comprises:
an actuator valve comprising a high-pressure inlet, a low-pressure inlet, and an outlet, the actuator valve movable between the high-pressure position, in which the outlet is in fluid communication with the high-pressure inlet and not in fluid communication with the low-pressure inlet, and the low-pressure position, in which the outlet is in fluid communication with the low-pressure inlet and not in fluid communication with the high-pressure inlet; and
an actuator coupled to receive the thrust control valve override signals and configured, in response thereto, to move the actuator valve between the high-pressure position and the low-pressure position.

11. The system of claim 9, wherein the thrust control valve further comprises a spring, the spring disposed within the valve body and supplying a bias force that urges the thrust control valve element toward the first position.

12. The system of claim 9, wherein:
the thrust control valve element includes an inner surface that defines a bore; and
the proportional bypass valve element is movably disposed within the bore.

13. The system of claim 9, wherein the actuator element comprises:
an actuator valve comprising a high-pressure inlet, a low-pressure inlet, and an outlet, the actuator valve movable between the high-pressure position, in which the outlet is in fluid communication with the high-pressure inlet and not in fluid communication with the low-pressure inlet, and the low-pressure position, in which the outlet is in fluid communication with the low-pressure inlet and not in fluid communication with the high-pressure inlet; and
an actuator coupled to receive the thrust control valve override signals and configured, in response thereto, to move the actuator valve between the high-pressure position and the low-pressure position.

14. The system of claim 12, wherein the thrust control valve further comprises a spring, the spring disposed within the valve body and supplying a bias force that urges the thrust control valve element toward the first position.

15. The system of claim 9, wherein the thrust control valve further comprises a fixed-area metering port disposed between the override inlet and the thrust control valve outlet.

16. A gas turbine engine fuel control system, comprising:
a fuel metering valve comprising a metering valve inlet and a metering valve outlet, the metering valve inlet adapted to receive a flow of fuel, the fuel metering valve further adapted to receive fuel flow command signals and configured, in response thereto, to control the flow of fuel through the metering valve outlet; and
a thrust control valve comprising:
a valve body having a main inlet, an override inlet, a thrust control valve outlet, a valve control pressure inlet port formed therein, a bypass outlet port, and a fixed-area metering port disposed between the override inlet and the thrust control valve outlet, the main inlet in fluid communication with the metering valve outlet, the override inlet in fluid communication with the metering valve inlet, a thrust control valve element disposed within the valve body and movable between a first position, in which the thrust control valve outlet is in fluid communication with the main inlet and fluidly isolated from the override inlet, and a second position, in which the thrust control valve outlet is in fluid communication with the override inlet and fluidly isolated from the main inlet, a proportional bypass valve element disposed within the valve body, the proportional bypass valve element movable with, and selectively movable relative to, the thrust control valve element, to thereby selectively place the bypass outlet port in fluid communication with the override inlet, and an actuator element coupled to receive thrust control valve override signals and configured, in response thereto, to move between a high-pressure position and a low-pressure position, wherein:
in the high-pressure position, the valve control pressure inlet port is adapted to receive fluid at a first pressure magnitude, to thereby move the thrust control valve element to the first position, and
in the low-pressure position, the valve control pressure inlet port is adapted to receive fluid at a second pressure magnitude, the second pressure lower than the first pressure magnitude, to thereby move the thrust control valve element to the second position.

* * * * *